K. KIEFER.
MOUNTING FOR CONVEYER ROLLERS.
APPLICATION FILED MAY 29, 1916.

1,291,021.

Patented Jan. 14, 1919.

Witnesses
M. A. Harrington
E. E. Finch

Inventor
Karl Kiefer

UNITED STATES PATENT OFFICE.

KARL KIEFER, OF CINCINNATI, OHIO.

MOUNTING FOR CONVEYER-ROLLERS.

1,291,021.   Specification of Letters Patent.   Patented Jan. 14, 1919.

Application filed May 29, 1916. Serial No. 100,593.

*To all whom it may concern:*

Be it known that I, KARL KIEFER, a citizen of the United States, and a resident of Cincinnati, in the county of Hamilton and State of Ohio, have invented certain new and useful Improvements in Mountings for Conveyer-Rollers, of which the following is a specification.

My invention relates to roller conveyers operating under the action of gravity, and other conveyers where there are a number of rollers spaced apart at short intervals, mounted in parallel side members.

The object of my invention is to provide mountings or bearings for the rollers of such conveyers, of simple and economical construction, which will at the same time operate with a minimum of friction and require a minimum of attention. Further, the object is to devise an anti-friction bearing capable of standing considerable wear, and at the same time being of sufficiently cheap manufacture to be used in conveyers as specified.

The invention is illustrated by a gravity roller conveyer, although it may be used on other conveyers coming within the limitations stated in the preamble.

Figure 1:
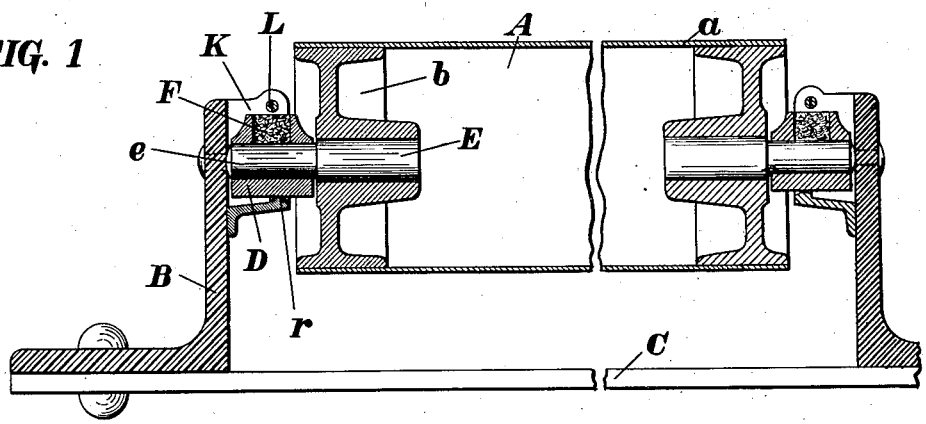
Figure 1 is a section through my improved bearing, representing one of a great many, showing the side members B in section.

In Fig. 1, A is part of one of the rollers consisting of a steel tube *a*, in which casting *b* is fastened at the end, either by being driven in tightly, or by otherwise connecting it. Into this casting *b* is driven the spindle E, part *e* of which is of somewhat reduced diameter, which is the bearing part proper, and which rotates in a swiveling bearing block D. Swiveling bearing blocks in conveyer have been patented to me in my Patent 1,175,641. In that patent they were directly carried in punched holes in the side members, which arrangement, while extremely simple, lacks several points of improvement which are now disclosed and claimed in this present application.

One of the first advantages of this present invention over the one patented, is that no sections are cut out of the side members which might weaken these side members, so as to prevent them from being spaced a considerable distance without any intermediate support.

Figure 2:
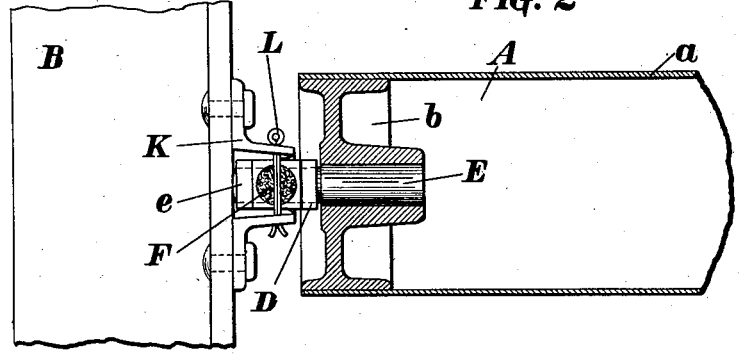
Fig. 2 is a top view upon the new bearing.
Figure 3:
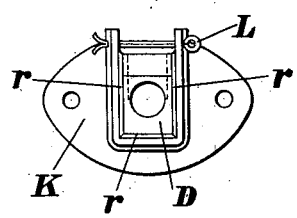
Fig. 3 is a side view upon the bearing and holder.

To provide a swiveling bearing, a special casting or punching K is riveted to the side members shown in the view Fig. 3, which casting carries bearing block D. As plainly seen in Fig. 1, the bearing block D does not rest with its entire surface upon the special casting K, but this special casting has a ridge *r*, which might be somewhat rounded as shown in Fig. 1, and upon which the bearing block can swivel. The bearing block D might be supported exactly in its center, or a little closer to the roller itself, as shown in this particular case. It is prevented from being lifted out by a cotter pin L shown in Figs. 1, 2, 3 and 4.

The side thrust of the rollers, which in my Patent 1,175,641 was taken up by the projection of the spindle E, is now taken up directly by the side members so that the bearings D are not subject to any side thrust whatever. For this purpose the spindle E is round at its head, causing reduction in the friction. A block of felt F holds by absorption the lubricant in contact with the bearing spindle.

It is easily seen that by removing the cotter pin on one side of the roller, the roller or bearing can be lifted out at once. This is of great advantage if any of the rollers or bearings should have to be taken out or replaced, and is desirable because the side members are usually spaced apart by members C, Fig. 1, which are usually riveted to the side members.

Figure 4:
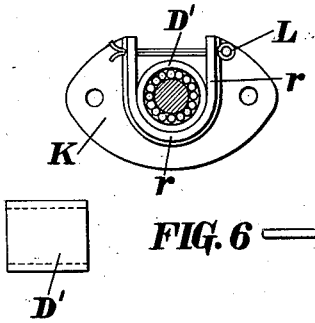
Fig. 4 is a modification of this bearing with holder.
Figure 5:
Figs. 5 and 6 are details of this modification.
Figure 6:

The whole arrangement as shown, lends itself at once to be used for an anti-friction roller bearing as shown in Figs. 4, 5 and 6. An anti-friction roller bearing is different from a ball bearing, in that it has not the adjustability of the latter. I have found, however, that if a roller bearing is made swiveling, as shown in this invention, it is possible to use it on such work as conveyers, where resistance to rough usage is essential, and where the rollers are not mathematically true cylinders with mathematically true spindles. By letting a roller bearing swivel in supports, as shown in Fig. 4, a sufficient deviation from the mathematical axis is made possible. A side thrust in this roller bearing is taken up same as in the bearing shown in Fig. 1 and Fig. 2, by the bearing members.

The pins as shown in Fig. 6 are loosely inserted, and the cylinder Fig. 5 is placed in the casting K just the same as in the bearing shown in Figs. 1, 2 and 3. Fig. 4 shows this bearing in a view, the ridge $r$ being narrow, same as ridge $r$ shown in Fig. 1 and if necessary, rounded, which will permit the swiveling of the roller bearing cylinder D' sufficiently to allow for any variation of the bearing spindle E.

In the drawings shown herein, it is assumed that the rollers are made of steel. The invention, however, is just as applicable to the use of rollers of wood or any other substance and still remain within the scope of the invention.

Having described my invention, what I claim and desire to secure by Letters Patent is:

1. In a conveyer, a roller, spindle means projecting from opposite ends of said roller, bearing members in which the respective spindle means have journal bearings, side members adjacent to the ends of the respective spindle means, and brackets fastened to the inner sides of the respective side members, and having narrow supporting surfaces on which said bearing members are supported.

2. In a conveyer, a roller, spindle means projecting from opposite ends of said roller, bearing members in which the respective spindle means have journal bearings, side members adjacent to the ends of the respective spindle means, and brackets fastened to the inner sides of the respective side members, and having narrow lower upwardly facing supporting surfaces on which the respective bearing members rest, and narrow lateral inwardly facing supporting surfaces to support said bearing members when they are displaced laterally in either direction.

3. In a conveyer, a roller, spindle means projecting from opposite ends of said roller, bearing members in which the respective spindle means have journal bearings, side members adjacent to the ends of the respective spindle means, brackets fastened to the inner sides of the respective side members, and having narrow supporting surfaces on which said bearing members are supported, and means separate from said bearing members for holding the respective bearing members down in the respective brackets.

4. In a conveyer, a roller, spindle means projecting from opposite ends of said roller, side members adjacent to the ends of the respective spindle means and limiting movement of said roller axially in either direction, bearing members in which the respective spindle means have journal bearings, and brackets fastened to said side members and supporting said bearing members so as to allow a swiveling function of said bearing members.

5. In a conveyer, a roller, spindle means projecting from opposite ends of said roller, side members with inner sides adjacent to the ends of the respective spindle means, bearing members receiving the respective spindle means, and brackets fastened to said inner sides of said side members and supporting the respective bearing members so as to allow a swiveling function of said bearing members, but said side members limiting axial outward displacement of said bearing members.

6. In a conveyer, a roller, spindle means projecting from opposite ends of said roller, side members with inner sides adjacent to the ends of the respective spindle means, roller bearings receiving the respective spindle means, and brackets fastened to said inner sides of said side members and supporting the respective roller bearings so as to allow a swiveling function of said roller bearings, but said side members limiting axial outward displacement of said roller bearings.

In testimony whereof I have hereunto signed my name in the presence of two subscribing witnesses.

KARL KIEFER.

Witnesses:
M. A. HARRINGTON,
E. E. FINCH.